(12) United States Patent
Choi et al.

(10) Patent No.: US 10,348,651 B2
(45) Date of Patent: Jul. 9, 2019

(54) APPARATUS AND METHOD FOR VIRTUAL SWITCHING (71) Applicant: ELECTRONICS AND TELECOMMUNICATIONS RESEARCH INSTITUTE, Daejeon (KR)

(72) Inventors: Kang-Il Choi, Daejeon (KR); Bhum-Cheol Lee, Daejeon (KR); Jung-Hee Lee, Daejeon (KR); Hyun-Yong Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 123 days.

(21) Appl. No.: 15/298,592

(22) Filed: Oct. 20, 2016

(65) Prior Publication Data

US 2017/0195261 A1      Jul. 6, 2017

(30) Foreign Application Priority Data

Dec. 30, 2015   (KR) .......................... 10-2015-0190116

(51) Int. Cl.
| *H04L 12/931* | (2013.01) |
| *H04L 12/26* | (2006.01) |
| *H04L 12/863* | (2013.01) |
| *H04L 12/713* | (2013.01) |
| *H04L 12/743* | (2013.01) |
| *H04L 12/741* | (2013.01) |

(Continued)

(52) U.S. Cl.
CPC .............. *H04L 49/70* (2013.01); *H04L 43/16* (2013.01); *H04L 45/54* (2013.01); *H04L 45/586* (2013.01); *H04L 45/7453* (2013.01); *H04L 47/2441* (2013.01); *H04L 47/50* (2013.01); *H04L 49/901* (2013.01)

(58) Field of Classification Search
CPC ......... H04L 49/90; H04L 49/70; H04L 43/16; H04L 43/12; H04L 43/106
See application file for complete search history.

(56) References Cited

U.S. PATENT DOCUMENTS

| 6,854,117 B1 | 2/2005 | Roberts |
| 7,765,405 B2 | 7/2010 | Pinkerton et al. |

(Continued)

FOREIGN PATENT DOCUMENTS

| KR | 10-2014-0091470 A1 | 7/2014 |
| KR | 10-1460848 B1 | 11/2014 |

(Continued)

*Primary Examiner* — Hoang-Chuong Q Vu
(74) *Attorney, Agent, or Firm* — LRK Patent Law Firm (57) ABSTRACT

An apparatus for virtual switching includes a queue memory configured to store at least one queue; a data memory configured to store data; a mapper configured to classify the data into flows and store a point of the data in a queue mapped with the flows; a plurality of virtual machines configured to perform a process based on the data; and a virtual switch configured to extract the data from the data memory by referring to the point stored in the queue and transfer the data to the virtual machine, wherein the virtual switch transfers the data corresponding to a single queue to a single virtual machine.

14 Claims, 7 Drawing Sheets

(51) Int. Cl.
*H04L 12/851* (2013.01)
*H04L 12/879* (2013.01)

(56) References Cited

U.S. PATENT DOCUMENTS

| | | | |
|---|---|---|---|
| 8,107,486 B1* | 1/2012 | Walsh | H04L 49/9015 370/351 |
| 8,346,999 B2 | 1/2013 | Dubal et al. | |
| 9,590,919 B2 | 3/2017 | Casado et al. | |
| 2010/0118868 A1* | 5/2010 | Dabagh | H04L 49/90 370/389 |
| 2011/0023029 A1* | 1/2011 | Diab | G06F 9/5077 718/1 |
| 2013/0239119 A1 | 9/2013 | Garg et al. | |
| 2014/0201738 A1 | 7/2014 | Choi et al. | |
| 2014/0281020 A1* | 9/2014 | Crisan | H04L 49/25 709/235 |
| 2014/0379928 A1 | 12/2014 | Song et al. | |
| 2015/0085665 A1* | 3/2015 | Kompella | H04L 47/2483 370/236 |
| 2015/0089500 A1* | 3/2015 | Kompella | H04L 43/18 718/1 |
| 2016/0048464 A1* | 2/2016 | Nakajima | G06F 12/1475 711/152 |
| 2016/0285753 A1* | 9/2016 | Guleria | H04L 45/38 |
| 2016/0380865 A1* | 12/2016 | Dubal | H04L 43/10 709/224 |
| 2017/0093677 A1* | 3/2017 | Skerry | H04L 43/12 |
| 2017/0149698 A1* | 5/2017 | Tsirkin | H04L 49/90 |

FOREIGN PATENT DOCUMENTS

| | | |
|---|---|---|
| KR | 10-2015-0000160 A1 | 1/2015 |
| KR | 10-2015-0024845 A1 | 3/2015 |
| KR | 10-2015-0078286 A1 | 7/2015 |

* cited by examiner

APPARATUS AND METHOD FOR VIRTUAL SWITCHING

CROSS REFERENCE TO RELATED APPLICATION

This application claims the benefit under 35 U.S.C. § 119(a) of Korean Patent Application No. 10-2015-0190116 filed on Dec. 30, 2015 in the Korean Intellectual Property Office, the entire disclosure of which is incorporated herein by reference for all purposes.

BACKGROUND

1. Technical Field

The following description relates to a virtual switching technology for distributing data to at least one virtual machine.

2. Description of Related Art

The virtual machine queue (VMQ) technology is a method for generating virtual machine queues inside a network interface card (NIC) to assign each virtual machine queue to a processor in a host. The virtual machine queue technology allows multiple processors to process for network traffic in a virtualized environment to enable flexible processings even at heavy traffics. A server system which supports the virtual machine queue sets a virtual machine queue and assigns a processor to process the virtual machine queue. The server system which supports the virtual machine queue may transfer data to a processor which operates the virtual machine through a L2 virtual switch. However, since the virtual machine queue technology allocates virtual machine queues statically, less number of processors may be allocated for the queue with bursty traffics or more number of processors may be allocated for the queue which rarely uses traffic.

Dynamic virtual machine queue (DVMQ) technology allows dynamically allocating virtual machine queues to multiple processors based on total amount of network traffic and total use amount of the processor. However, since the dynamic virtual machine queue technology allows dynamically allocating processors based on queues assigned to each virtual machine, traffic has to be classified and processed based on the layer 2 (L2, MAC address) of the virtual machine and further processing of network traffic of virtual machines in a certain tenant can be affected by bursty network traffic in a different tenant.

The VMQ, VMDQ technologies have limits to provide good QOS (Quality of Service) because traffic classification is performed only based on L2 (MAC address) unit.

SUMMARY

This Summary is provided to introduce a selection of concepts in a simplified form that are further described below in the Detailed Description. This Summary is not intended to identify key features or essential features of the claimed, subject matter, nor is it intended to be used as an aid in determining the scope of the claimed subject matter.

An object of the present disclosure is to provide an apparatus and a method for virtual switching which is able to classify traffic based on layer 3 (L3) or above and thus, bursty network traffic in a certain tenant does not affect for processing of network traffic in a different tenant, while not causing reordering of data included in the traffic of a virtualized environment.

According to an aspect of the present disclosure, an apparatus for virtual switching includes a queue memory configured to store queue memory; a data memory configured to store data; a mapper configured to classify the data into flows and store a pointer of the data into a queue mapped with the flow; a plurality of virtual machines configured to perform a process based on the data; and a virtual switch configured to extract the data from the data memory by referring to the painter stored in the queue and transfer the data to the virtual machine, wherein the virtual machine transfers the data corresponding to a single queue to a single virtual machine.

The apparatus for virtual switching may further include a table provider configured to store a flow table comprising flow information which is information to identify the flow and queue information which is information to identify the queue, wherein the mapper determines the queue mapped with the flow by referring to the flow table.

The mapper may map the flow with a new queue or an, existing activated queue when the flow is not mapped with the existing activated queue in the flow table.

The mapper may map the flow with the new queue when the number of pointers stored in each existing activated queue is greater than a predetermined threshold, and the mapper may map the flow with the existing activated queue when there is any queue, of which the number of stored pointers is not greater than a predetermined threshold, among the existing activated queues.

The apparatus for virtual switching may further include a virtual switch manager configured to assign a virtual switch for the new queue when the mapper maps the flow with the new queue.

The virtual switch manager may generate a new virtual switch and assign the new virtual switch as a virtual switch for the new queue when data capacity transferred through the assigned virtual switch is equal to or greater than a predetermined threshold.

The mapper may map the flow with the queue, where the least pointers are stored, among the existing activated queues, when there is a queue of which the number of stored pointers is not greater than a predetermined threshold and a mapping mode is a power saving mode.

The mapper may map the flow with the queue, where the most pointers are stored, among the existing activated queues, when there is a queue of which the number of stored pointers is not greater than a predetermined threshold and a mapping mode is an even distribution mode.

The mapper may classify the data in accordance with flow information which is a value bit-masked or a value applied with a hash function for an identification reference value of the data.

The mapper may classify the data in accordance with flow information which is a combined value of a value bit-masked or a value applied with a hash function for an identification reference value of the data and tenant information of the virtual machine.

According to another aspect of the present disclosure, a method for virtual switching in a method for performing a parallel processing by an apparatus for virtual switching, includes receiving data and storing the data in a data memory; classifying the data into flows; storing a pointer of the data into a queue mapped with the flows; extracting the data from the data memory by referring to the pointer stored in the queue and transferring the data to a virtual machine assigned to the queue; and performing a process corresponding to the data through the virtual machine assigned to the queue.

The method for virtual switching may further include identifying a queue mapped with the flow by referring, to a flow table comprising flow information which is information to identify the flow and queue information which is information to identify the queue.

The method for virtual switching may further include mapping the flow with a new queue or an existing activated, queue when the flow is not mapped with, the existing activated queue in the flow table.

The mapping the flow with a new queue or an existing activated queue when flow information corresponding to the flow is not stored in the flow table may include mapping the flow with the new queue when flow information corresponding to the flow is, not stored in the flow table and the number of pointers stored in each existing activated queue is greater than a predetermined threshold; and mapping the flow with an existing activated queue when flow information corresponding to the flow is not stored in the flow table and there is any queue, of which the number of stored pointers is not greater than a predetermined threshold, among the existing activated queues.

The method for virtual switching may further include assigning a virtual switch for the new queue when the flow is mapped with the new queue; and assigning a single processor for the new queue.

The assigning a virtual switch for the new queue when the flow is mapped with the new queue may include, generating a new virtual switch and assigning the new virtual switch as a virtual switch for the new queue when data capacity transferred through the assigned virtual switch is equal to or greater than a predetermined threshold.

The mapping the flow with the existing activated queue when flow information corresponding to the flow is not stored in the flow table and there is any queue, of which the number of stored pointers is not greater than a predetermined threshold, among the existing activated queues may include mapping the flow with the queue, where the least pointers are stored, among the existing activated queues, when a mapping mode is a power saving mode.

The mapping the flow with the existing activated queue when flow information corresponding to the flow is not stored in the flow table and there is any queue, of which the number of stored pointers is not greater than a predetermined threshold, among the existing activated queues may include mapping the flow with the queue, where the most pointers, are stored, among the existing activated queues, when a mapping mode is an even distribution mode.

The classifying the data into flows may include classifying the data into flows in accordance with flow information which is a value bit-masked or a value applied with the hash function for an identification reference value of the data.

The classifying the data into flows may include classifying the data into flows in accordance with flow information which is a combined value of a value bit-masked or a value applied with the hash, function for an identification reference value of the data and tenant information of the virtual machine.

According to an embodiment of the present disclosure, traffic can be distributed to each virtual machine, while not causing reordering of data included in the traffic of a virtualized environment.

According to an embodiment of the present disclosure, good QOS (Quality of Service) can be provided by classifying traffic based on layer 3 (L3) or above.

According to an embodiment of the present disclosure, bursty network traffic in a certain tenant may not affect for processing of network traffic in a different tenant.

BRIEF DESCRIPTION OF DRAWINGS

Hereinafter, the following description will be described with reference to embodiments illustrated in the accompanying drawings. To help understanding of the following description, throughout the accompanying drawings, identical reference numerals are assigned to identical elements. The elements illustrated throughout the accompanying drawings are mere examples of embodiments illustrated for the purpose of describing the following description and are not to be used to restrict the scope of the following description.

Throughout the drawings and the detailed description, the same reference numerals refer to the same elements. The drawings may not be to scale, and, the relative size, proportions, and depiction of elements in the drawings may be exaggerated for clarity, illustration, and convenience.

DETAILED DESCRIPTION

Since there can be a variety of permutations and embodiments of the following description, certain embodiments will be illustrated and described with reference to the accompanying drawings. This, however, is by no means to restrict the following description to certain embodiments, and shall be construed as including all permutations, equivalents and substitutes covered by the ideas and scope of the following description. Throughout the description of the present disclosure, when describing a certain technology is determined to evade the pointer of the present disclosure, the pertinent detailed description will be omitted. Unless clearly used otherwise, expressions in the singular number include a plural meaning. When one element is described as "transferring a signal" or "transferring a signal" to another element, it shall be construed as transferring or transferring a signal to the other element directly but also as possibly having another element in between.

Figure 1:
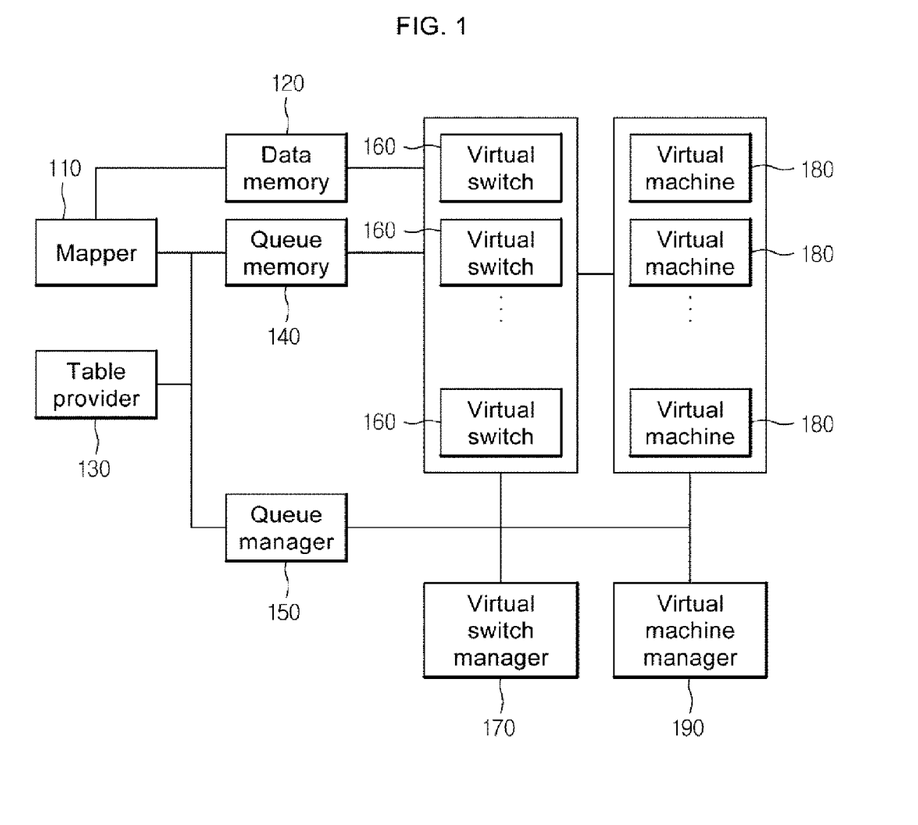
FIG. 1 is a diagram illustrating an apparatus for virtual switching according to a first embodiment of the present disclosure.

FIG. 1 is a diagram illustrating an apparatus for virtual switching according to a first embodiment of the present disclosure.

Referring to FIG. 1, an apparatus for virtual switching according to a first embodiment of the present disclosure may include a mapper 110, a data memory 120, a table provider 130, a queue memory 140, a queue manager 150, a plurality of virtual switches 160, a virtual switch manager 170, a plurality of virtual machines 180, and a virtual machine manager 190.

The mapper 110 may receive data (hereinafter, referring to input data for the data which the mapper 110 receives) through network, classify the input data into one of predetermined flows in accordance with attributes by referring to a flow table, store the input data in the data memory 120, and store a pointer, representing an address in which the input data is stored, in a queue mapped with the flow of the input data. Here, the flow table may be a table representing a mapping relationship between each flow and each queue. For example, the flow table may be a table to store a result mapped between flow information, which is a bit masked value for values included in a header of the input data such as a SIP (Source Internet Protocol) address value, a DIP (Destination Internet Protocol) address value, a SPORT (Source Port) field value, a DPORT (Destination Port) field value, a PROTOCOL field value and the like or values (hereinafter, referred to as identification reference value) included in payload information of the input data, and queue information, which is identification information to distinguish one queue from another queue. The mapper 110 may search queue information mapped to the bit masked value for the identification reference value from the flow table and store a pointer corresponding to the input data in a queue corresponding to the queue information.

Furthermore, the flow table may be a table to store a result mapped between flow information which is a size value determined by applying a hash function for the identification reference value and queue information. The mapper 110 may search queue information mapped to the size value determined by applying a hash function for the identification reference value and store a pointer corresponding to the input data in a queue corresponding to the queue information.

In addition, when flow information, which is a size value determined by applying a hash function for the identification reference value, is an address, the flow table may be a table to store queue information in the address.

The mapper 110 may store a pointer corresponding to the input data in a queue corresponding to the queue information stored in the storage of which address is the flow information, which is a size value determined by applying a hash function for the identification reference value.

The mapper 110 may map flow expiration information of each flow to the flow information and store the result in the flow table. The flow expiration information may be a value of a bit or more and be reference information for determining when to deactivate each flow.

When the flow information corresponding to the input data is mapped with the queue information, the mapper 110 may extract queue information mapped to corresponding flow information and store a pointer corresponding to the input data in a queue corresponding to the queue information. On the other hand, when the flow information corresponding to the input data is not mapped with the queue information, the mapper 110 may determine whether the number of pointers stored in each queue, which is activated in the current queue memory 140, is greater than a predetermined threshold. When the number of pointers stored in each queue, which is activated in the current queue memory 140, is greater than a predetermined threshold, the mapper 110 may transfer a queue generation request signal to request for generating a new queue to the queue manager 150. When queue information is received from the queue manager 150, the mapper 110 may store a pointer corresponding to the input data in the new queue. On the other hand, when the number of pointers stored in each queue, which is activated in the current queue memory 140, is not greater than a predetermined threshold, the mapper 110 may store a pointer corresponding, to the input data in any one of queues activated to the current queue memory 140.

Here, when a predetermined mapping mode is a "power saving mode", the mapper 110 may store a pointer corresponding to the input data in a queue, in which the most pointers are stored, among queues of which the number of stored pointers is not greater than a predetermined threshold. On the other hand, when a predetermined mapping mode is an "even distribution mode", the mapper 110 may store a pointer corresponding to the input data in a queue, in which the least pointers are stored, among queues of which the number of stored pointers is not greater than a predetermined threshold.

Here, the mapping mode may be a mode which is predetermined by a user and be divided into the "power saving mode" and the "even distribution mode" which describe how a pointer is stored in, a queue. The mapper 110 may perform an update process by mapping the flow information with the queue information and storing the result in the flow table after storing the pointer in the queue and transfer a queueing completion signal which notifies the completion of queueing the pointer for the input data to the queue manager 150. When the flow corresponding to the input data is a new flow (when the flow information and the queue information are not mapped), the mapper 110 may transfer a new flow signal, which notifies queueing for the new flow, to the queue manager 150, after completion of queueing for the input data.

Furthermore, when the pointer corresponding to the input data is stored in the queue corresponding to the queue information, the mapper 110 may reset flow expiration information mapped to the flow information corresponding to the input data as a predetermined value.

The data memory 120 may store the input data when the input data is received from the mapper 110.

The table provider 130 may store the flow table and also search or update the flow table at the request of the mapper 110.

The queue memory 140 may store the pointer corresponding to the input data through at least one queue.

The queue manager 150 may generate a new queue in the queue memory 140 when a queue generation request signal is received from the mapper 110 and transfer a queue generation completion signal, which notifies completion of generation of the new queue, to the virtual switch manager 170. When an assignment completion signal, which notifies completion of assignment of the virtual switch 160 to distribute data stored in the new queue or the virtual machine 180 to process data stored in the new queue, is received from the virtual switch manager 170, the queue manager 150 may update the queue table to store queue information corresponding to the new queue in the table provider 130. Here, the queue table may be a table to store the result generated by mapping current activated queue information, the number of pointers stored in each queue, and queue expiration information. The queue expiration information may be a value of 1 bit or more and may be reference information to determine when to deactivate each queue, of which an initial value may be 0. After updating the queue table, the queue manager 150 may transfer the new queue information to the mapper 110. When the queueing completion signal is received from the mapper 110, the queue manager 150 may, update the number of queued pointers in, the queue corresponding to the queueing completion signal (by 1). When the new flow signal is received from the mapper 110, the queue manager 150 may increase the queue expiration information by 1.

At least one virtual switch 160 may extract the input data corresponding to the pointer stored in at least one queue from the data memory 120 and distribute the input data to at least one virtual machine 180 based on a distribution policy such as round robin, weighted round robin or the like. Here, the virtual switch 160 may distribute input data in, a flow corresponding to a single queue to a single virtual machine 180. In other words, the virtual switch 160 does not distribute input data in a flow corresponding to a single queue to two or more different virtual machines 180. Here, the virtual switch 160 may transfer a distribution completion signal to the queue manager 150 after transferring the input data corresponding to the pointer stored in the queue to the virtual machine 180. The queue manager 150 may then deduct the number of pointers corresponding to the queues stored in the queue table when the distribution completion signal is received.

When a queue generation completion signal for a new queue is received from the queue manager 150, the virtual switch manager 170 may assign the virtual switch 160 to distribute the input data of the new queue. After assigning the virtual switch 160, the virtual switch manager 170 may transfer an assignment completion signal to the queue manager 150. The virtual switch 160 may transfer the input data corresponding to the queue assigned by the virtual switch manager 170 to at least one virtual machine 180. The virtual switch manager 170 may initially assign one virtual switch 160 to each queue so that the one virtual switch 160 may transfer the input data to at least one virtual machine 180. When capacity of the input data to be transferred through one virtual switch 160 is equal to or greater than a predetermined threshold, the virtual switch manager 170 may generate a new virtual switch 160 and assign the new virtual switch 160 as a virtual switch to distribute the input data of the new queue.

At least one virtual machine 180 may receive the input data from the virtual switch 160 and perform a process based on the input data. Here, when the virtual machine 180 processes all flow data corresponding to a single queue, it may process all flow data regardless of the number of flows. On the other hand, when the virtual machine 180 cannot process all flow data corresponding to a single queue, the queue manager 150 may generate a new queue in the queue memory 140 and transfer a queue generation completion signal for the generation of the new queue to the virtual switch manager 170, Here, when the number of pointers stored in a single queue is greater than a predetermined threshold by referring to the queue table, the queue manager 150 may determine as that the virtual machine 180 cannot process all flow data corresponding to the single queue. On the other hand, when the number of pointers stored in a single queue is equal to or less than a predetermined threshold by referring to the queue table, the queue manager 150 may determine as that the virtual machine 180 can process all flow data corresponding to the single queue.

The plurality of virtual machines 180 may receive data from the virtual switch 160 and process the received data. The virtual machine 180 may be a virtual machine which is operated through at least one processor.

The virtual machine manager 190 may manage life cycles (generation, starting, stopping, restarting, duplication, deletion of a virtual machine and the like) of each virtual machine 180.

The mapper 110 may initialize to deactivate flow information, queue information and flow expiration information of a deactivatable flow from the flow table by periodically referring to flow expiration information of the flow table. Here, the mapper 110 may periodically deduct the flow expiration information of each flow of the flow table by 1 and determine the flow, of which flow expiration information is 0, as a deactivatable flow.

The mapper 110 may also deduct queue expiration information for the queue, mapped with the flow of which flow expiration information is 0, from the queue expiration information stored in the queue table by 1.

The queue manager 150 may periodically determine a deactivatable queue by referring to the queue table. For example, the queue manager 150 may determine the queue, of which the number of pointers stored in the queue table is 0 and the queue expiration information is 0, as a deactivatable queue. When any one queue is determined as a deactivatable queue, the queue manager 150 may transfer a deactivation request signal requesting for deactivating the corresponding queue to the virtual switch manager 170.

When the deactivation request signal is received, the virtual switch manager 170 may let at least one virtual switch 160 stop distributing input data to the corresponding queue. When at least one virtual switch 160 does not distribute input data, the virtual switch manager 170 may also deactivate the corresponding virtual switch 160.

Figure 2:
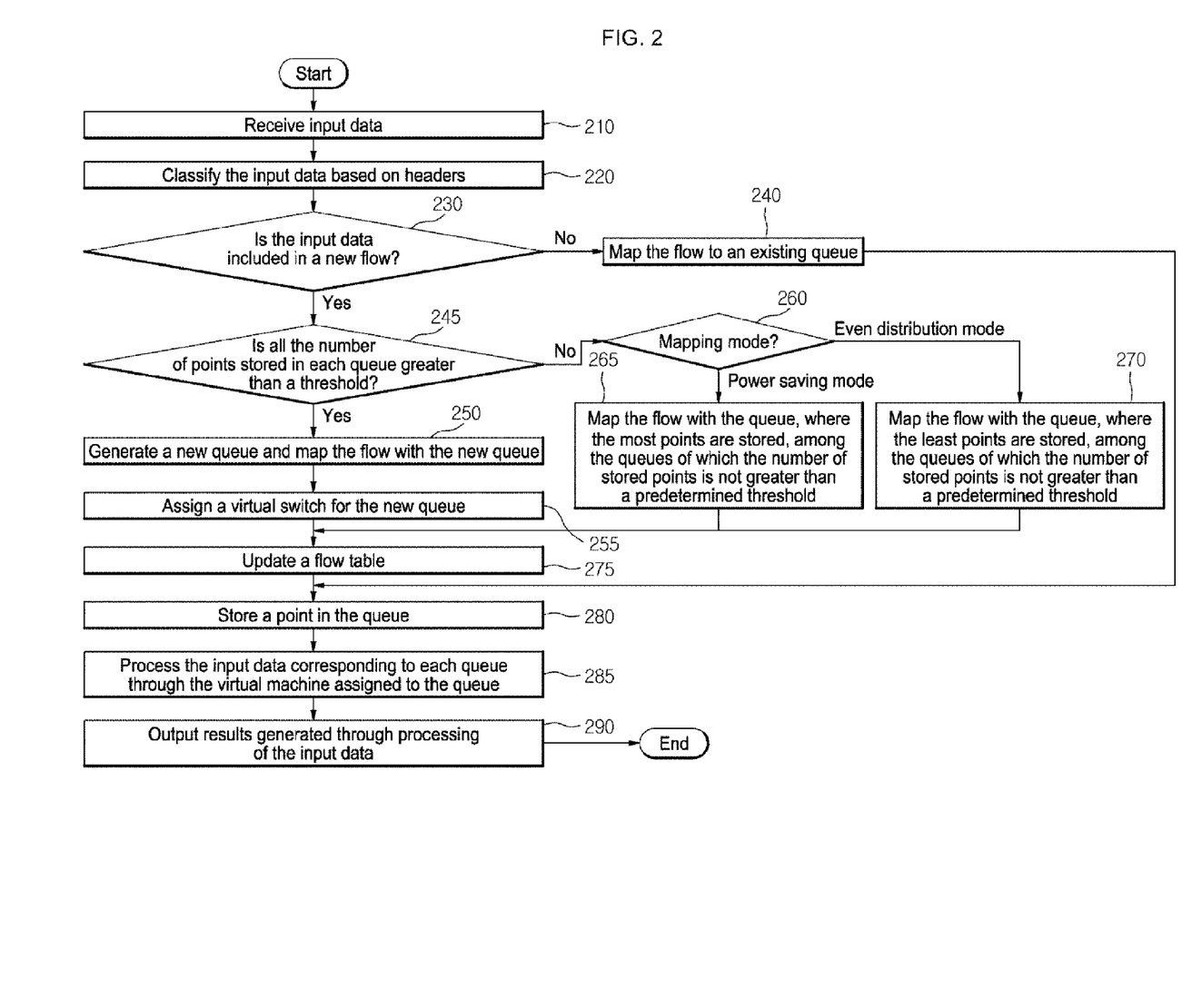
FIG. 2 is a flowchart illustrating a process for performing virtual switching by an apparatus for virtual switching according to a first embodiment of the present disclosure.
Figure 3:
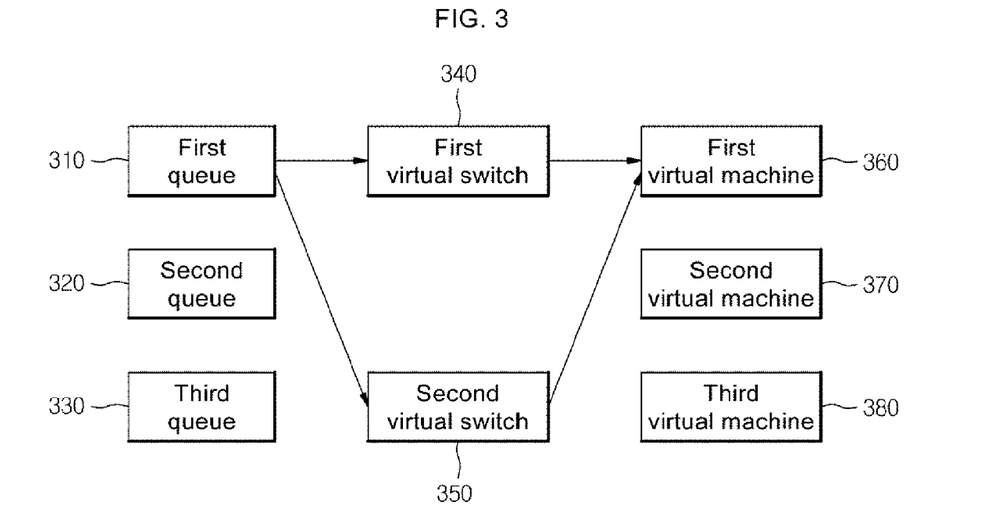
FIG. 3 is a diagram illustrating a transmission path of input data for each queue of an apparatus for virtual switching according to a first embodiment of the present disclosure to a virtual machine.

FIG. 2 is a flowchart illustrating a process for performing virtual switching by an apparatus for virtual switching according to a first embodiment of the present disclosure, and FIG. 3 is a diagram illustrating a transmission path of input data for each queue of an apparatus for virtual switching according to a first embodiment of the present disclosure to a virtual machine. The method to be explained below is performed through each unit of the apparatus for virtual switching. However, an object of each process will be called as an apparatus for virtual switching for concise and clear description.

Referring to FIG. 2, in step 210, the apparatus for virtual switching may receive input data. In step 220, the apparatus for virtual switching may classify the input data into at least one flow in accordance with attributes. For example, the apparatus for virtual switching may classify the input data into at least one flow in accordance with bit masked values for values included in a header of the input data such as SIP, DIP, SPORT, DPORT, PROTOCOL and the like. The apparatus for virtual switching may also classify input data into at least one flow in accordance with values generated by applying a hash function for values included in a header of the input data such as SIP, DIP, SPORT, DPORT, PROTOCOL and the like. Here, the apparatus for virtual switching may store the input data corresponding to each flow in the data memory 120.

In step 230, the apparatus for virtual switching may determine whether the input data is classified as a new flow. For example, the apparatus for virtual switching determines whether the input data is classified as a new flow based on whether flow information and queue information, which are corresponding to the input data, are mapped in a flow table.

When the input data is not classified as a new flow, in step 240, the apparatus for virtual switching may map the input data to a queue as an existing activated flow. For example, when flow information corresponding to the input data is stored in the flow table, the apparatus for virtual switching may extract queue information mapped to the flow information and store a pointer corresponding to the input data in a queue corresponding to the queue information.

When the input data is classified as a new flow, in step 245, the apparatus for virtual switching may determine whether the number of pointers stored in each queue is greater than a predetermined threshold through referring to a queue table.

When the number of pointers stored in each queue is greater than a predetermined threshold in step 245, in step 250, the apparatus for virtual switching may generate a new queue and map the new flow with the new queue.

In step 255, the apparatus for virtual switching may assign the virtual switch 160 and the virtual machine 180 for the new queue. Here, the apparatus for virtual switching may assign a single virtual machine 180 for the new queue. Here, each virtual switch may switch the data queued to at least one queue according to a dynamic policy such as round robin, weighted round robin and the like and transfer the result to the virtual machine.

When the number of stored pointers is not greater than a predetermined threshold, in step 260, the apparatus for virtual switching may determine what a mapping mode is.

When the mapping mode is a power saving mode in step 260, in step 265, the apparatus for virtual switching may map the flow with the queue, where the most pointers are stored, among the queues of which the number of stored pointers is not greater than a predetermined threshold.

When the mapping mode is an even distribution mode in step 260, in step 270, the apparatus for virtual switching may map the flow with the queue, where the least pointers are stored, among the queues of which the number of stored pointers is not greater than a predetermined threshold.

In step 275, the apparatus for virtual switching may update the flow table based on the flow and the queue which are mapped in the previous step.

In step 280, the apparatus for virtual switching may store a pointer of the input data in the queue mapped with the flow.

In step 285, the apparatus for virtual switching may process the input data corresponding to each queue through the virtual machine 180 assigned to the corresponding queue. Here, since the single virtual machine 180 is assigned for each queue, the apparatus for virtual switching, may transfer the input data corresponding to the single queue to the single virtual machine 180 through at least one virtual switch 160. Referring to FIG. 3, it is assumed that the apparatus for virtual switching activates a first queue 310, a second queue 320, a third queue 330, a first virtual switch 340, a second virtual switch 350, a first virtual machine 360, a second virtual machine 370 and a third virtual machine 380, and the first virtual switch 340, the second virtual switch 350 and the first virtual machine 360 are assigned for the first queue 310. In this case, the apparatus for virtual switching may transfer input data corresponding to the first queue 310 to the first virtual machine 360 through the first virtual switch 340 and the second virtual switch 350. Here, the apparatus for virtual switching may prevent from switching, a processing order of the input data by transferring the input data corresponding to the first queue 310 only to the first virtual machine 360, instead of other virtual machines 370, 380.

In step 290, the apparatus for virtual switching may output results generated through processing of the input data through each virtual machine.

Figure 4:
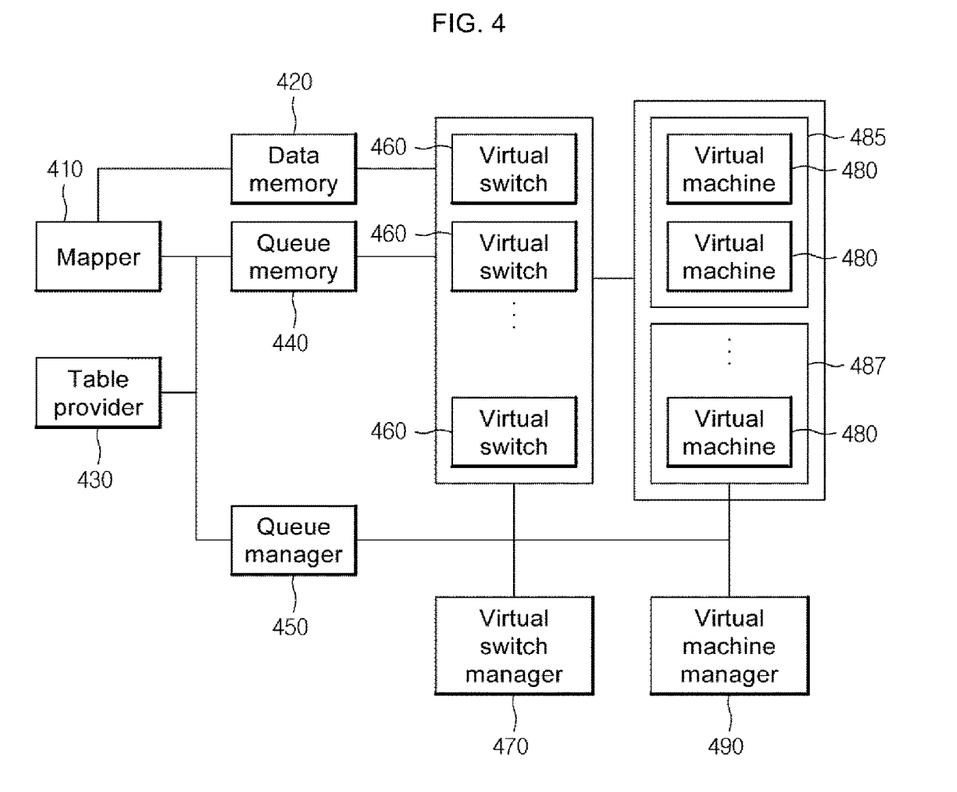
FIG. 4 is a diagram illustrating an apparatus for virtual switching according to a second embodiment of the present disclosure.

FIG. 4 is a diagram illustrating an apparatus for virtual switching according to a second embodiment of the present disclosure.

Referring to FIG. 4, an apparatus for virtual switching apparatus for virtual switching includes a mapper 410, a data memory 420, a table provider 430, a queue memory 440, a queue manager 450, a plurality of virtual switches 460, a virtual switch manager 470, a plurality of virtual machines 480, and a virtual machine manager 490.

The mapper 410 may receive data (hereinafter, referring to input data for the data which the mapper 410 receives) through network, classify the input data into one of predetermined flows in accordance with attributes by referring to a flow table, store the input data in the data memory 420, and store a pointer, representing an address in which the input data is stored, in a tenant queue mapped with the flow of the input data. Here, the tenant queue may be a queue corresponding to a tenant of each virtual machine 480 and at least one tenant queue may be generated for each tenant. A process for generating a tenant queue will be explained in more detail later. Here, the flow table may be a table representing a mapping relationship between each flow and each tenant queue. For example, the flow table is a table to store a result mapped between flow information, which is sum of a bit masked value for values included in a header of the input data such as SIP (Source Internet Protocol) address value, DIP (Destination Internet Protocol) address value, SPORT (Source Port) field value, DPORT (Destination Port) field value, PROTOCOL field value and the like or values (hereinafter, referred to as identification reference value) included in payload information of the input data and tenant information of the virtual machine 480, and queue information, which is identification information to distinguish one queue from another queue. Here, the tenant information of the virtual machine 480 may be a VLAN ID field value or a tunneling protocol ID field value of the input data. The mapper 410 may search queue information mapped to the bit masked value for the identification reference value from the flow table and store a pointer corresponding to the input data in a tenant queue corresponding to the queue information.

Furthermore, the flow table may be a table to store a result mapped between flow information, which is a combined value of a size value generated by applying a hash function for the identification reference value and tenant information of the virtual machine 480, and queue information. The mapper 410 may search queue information mapped to the size value determined by applying a hash function for the identification reference value and store a pointer corresponding to the input data in a tenant queue corresponding to the queue information.

In addition, when flow information, which is a combined value of a size value generated by applying a hash function for the identification reference value and tenant information of the virtual machine 480, is an address, the flow table may be a table to store queue information in the address. The mapper 410 may store a pointer corresponding to the input data in a tenant queue corresponding to the queue information stored in the storage of which address is the flow information.

The mapper 410 may map flow expiration information of each flow to the flow information and store the result in the flow table. The flow expiration information may be a value of a bit or more and be reference information for determining when to deactivate each flow.

When the flow information corresponding to the input data is mapped with the queue information, the mapper 410 may extract queue information mapped to corresponding flow information and store a pointer corresponding to the input data in a tenant queue corresponding to the queue information. On the other hand, when the flow information corresponding to the input data is not mapped with the queue information, the mapper 410 may determine whether the number of pointers stored in each queue which is activated in the current queue memory 440 is greater than a predetermined threshold. When the number of pointers stored in each queue which is activated in the current queue memory 440 is greater than a predetermined threshold, the mapper 410 may transfer a queue generation request signal to request for generating a new queue to the queue manager 450. When queue information corresponding to the new tenant queue is received from the queue manager 450, the mapper 410 may store a pointer corresponding to the input data in the new tenant queue. On the other hand, when the number of pointers stored in each tenant queue which is activated in the current queue memory 440 is not greater than a predetermined threshold, the mapper 410 may store a pointer corresponding to the input data in any one of tenant queues activated to the current queue memory 440.

Here, when a predetermined mapping mode is a "power saving mode", the mapper 410 may store a pointer corresponding to the input data in a tenant queue, in which the most pointers are stored, among tenant queues of which the number of stored pointers is not greater than a predetermined threshold. On the other hand, when a predetermined mapping mode is an "even distribution mode", the mapper 410 may store a pointer corresponding to the input data in a tenant queue, in which the least pointers are stored, among tenant queues of which the number of stored pointers is not greater than a predetermined threshold.

Here, the mapping mode is a mode which is predetermined by a user and is divided into the "power saving mode" and the "even distribution mode" which describe how a pointer is stored in a queue. The mapper 410 may perform an update process by mapping the flow information with the queue information and storing the result in the flow table after storing the pointer in the queue, and transfer a queueing completion signal, which notifies the completion of queueing the pointer for the input data, to the queue manager 450. When the flow corresponding to the input data is a new flow (when the flow information and the queue information are not mapped), the mapper 410 may transfer a new flow signal, which notifies queueing for the new flow, to the queue manager 450, after completion of queueing for the input data.

Furthermore, when the pointer corresponding to the input data is stored in the tenant queue corresponding to the queue information, the mapper 410 may reset flow expiration information mapped to the flow information corresponding to the input data as a predetermined value.

The data memory 420 may store the input data when the input data is received from the mapper 410.

The table provider 430 may store the flow table and may also search or updates the flow table at the request of the mapper 410.

The queue memory 440 may store the pointer corresponding to the input data through at least one queue.

The queue manager 450 may generate a new tenant queue in the queue memory 440 when a queue generation request signal is received from the mapper 410 and transfer a queue generation completion signal, which notifies completion of generation of the new queue, to the virtual switch manager 470. When an assignment completion signal, which notifies completion of assignment of the virtual switch 460 to distribute data stored in the new tenant queue, the queue manager 450 may update the queue table to store queue information corresponding to the new tenant queue in the table provider 430. Here, the queue table may be a table to store the result generated by mapping current activated queue information, the number of pointers stored in each tenant queue, and queue expiration information. The queue expiration information may be a value of 1 bit or more and may be reference information to determine when to deactivate each queue, of which an initial value may be 0. After updating the queue table, the queue manager 450 may transfer the new queue information to the mapper 410. When the queueing completion signal is received from the mapper 410, the queue manager 450 may update the number of queued pointers in the tenant queue corresponding to the queueing completion signal (by 1). When the new flow signal is received from the mapper 410, the queue manager 450 may increase the queue expiration information by 1.

At least one virtual switch 460 may extract the input data corresponding to the pointer stored in at least one tenant queue from the data memory 420 and distribute the input data to at least one virtual machine 480 based on a distribution policy such as round robin, weighted round robin or the like. Here, the virtual switch 460 may distribute input data in a flow corresponding to a single queue to a single virtual machine 480. In other words, the virtual switch 460 does not distribute input data in, a flow corresponding to a single queue to two or more different virtual machines 480. Here, the virtual switch 460 may transfer a distribution completion signal to the queue manager 450 after transferring the input data corresponding to the pointer stored in the tenant queue to the virtual machine 480. The queue manager 450 may then deduct, the number of pointers corresponding to the tenant queues stored in the queue table when the distribution completion signal is received. Furthermore, the virtual switch 460 may transfer input data in a tenant queue corresponding to a certain tenant (e.g., 485) to the virtual machine 480 corresponding to the certain tenant (e.g., 485).

When a queue generation completion signal for a new tenant queue is received from the queue manager 450, the virtual switch manager 470 may assign the virtual switch 460 to distribute the input data of the new tenant queue. After assigning the virtual switch 460, the virtual switch manager 470 may transfer an assignment completion signal to the queue manager 450. The virtual switch 460 may transfer the input data corresponding to the tenant, queue assigned by the virtual switch manager 470 to at least one virtual machine 480. The virtual switch manager 470 may initially assign one virtual switch 460 to each queue so that the one virtual switch 460 may transfer the input data to at least one virtual machine 480. When capacity of the input data to be transferred through one virtual switch 460 is equal to or greater than a predetermined threshold, the virtual switch manager 470 may generate a new virtual switch 460 and assign the new virtual switch 460 as a virtual switch to distribute the input data of the new queue.

At least one virtual machine 480 may receive the input data from the virtual switch 460 and perform a process based on the input data. Here, when the virtual machine 480 processes all flow data corresponding to a single tenant queue, it may process all flow data regardless of the number of flows. On the other hand, when the virtual machine 480 cannot process all flow data corresponding to a single queue, the queue manager 450 may generate a new tenant, queue in the queue memory 440 and transfer a queue generation completion signal for the generation of the new queue to the virtual switch manager 470. Here, when the number of pointers stored in a single tenant queue is greater than a predetermined threshold by referring to the queue table, the queue manager 450 may determine as that the virtual machine 480 cannot process all flow data corresponding to the single queue. On the other hand, when the number of pointers stored in a single tenant queue is equal to or less than a predetermined threshold by referring to the queue table, the queue manager 450 may determine as that the virtual machine 480 can process all flow data corresponding to the single queue.

The plurality of virtual machines 480 may receive data from the virtual switch 460 and process the received data. The virtual machine 480 may be a virtual machine which is operated through at least one processor.

The virtual machine manager 490 may manage life cycles (generation, starting, stopping, restarting, duplication, deletion of a virtual machine and the like) of each virtual machine 480.

The mapper 410 may initialize to deactivate flow information, queue information and flow expiration information of a deactivatable flow from the flow table by periodically referring to flow expiration information of the flow table. Here, the mapper 410 may periodically deduct the flow expiration information of each flow of the flow table by 1 and determine the flow, of which flow expiration information is 0, as a deactivatable flow.

The mapper 110 may also deduct queue expiration information for the tenant queue, mapped with the flow of which flow expiration information is 0, from the queue expiration information stored in the queue table by 1.

The queue manager 450 may periodically, determine a deactivatable tenant queue by referring to the queue table. For example, the queue manager 450 may determine the queue, of which the number of pointers stored in the queue table is 0 and the queue expiration information is 0, as a deactivatable tenant queue. When any one queue is determined as a deactivatable tenant queue, the queue manager 450 may transfer a deactivation request signal requesting for deactivating the corresponding queue to the virtual switch manager 470.

When the deactivation request signal is received, the virtual switch manager 470 may let at least one virtual switch 460 stop distributing input data to the corresponding tenant queue. When at least one virtual switch 460 does not distribute input data, the virtual switch manager 470 may also deactivate the corresponding virtual switch 460.

Figure 5:
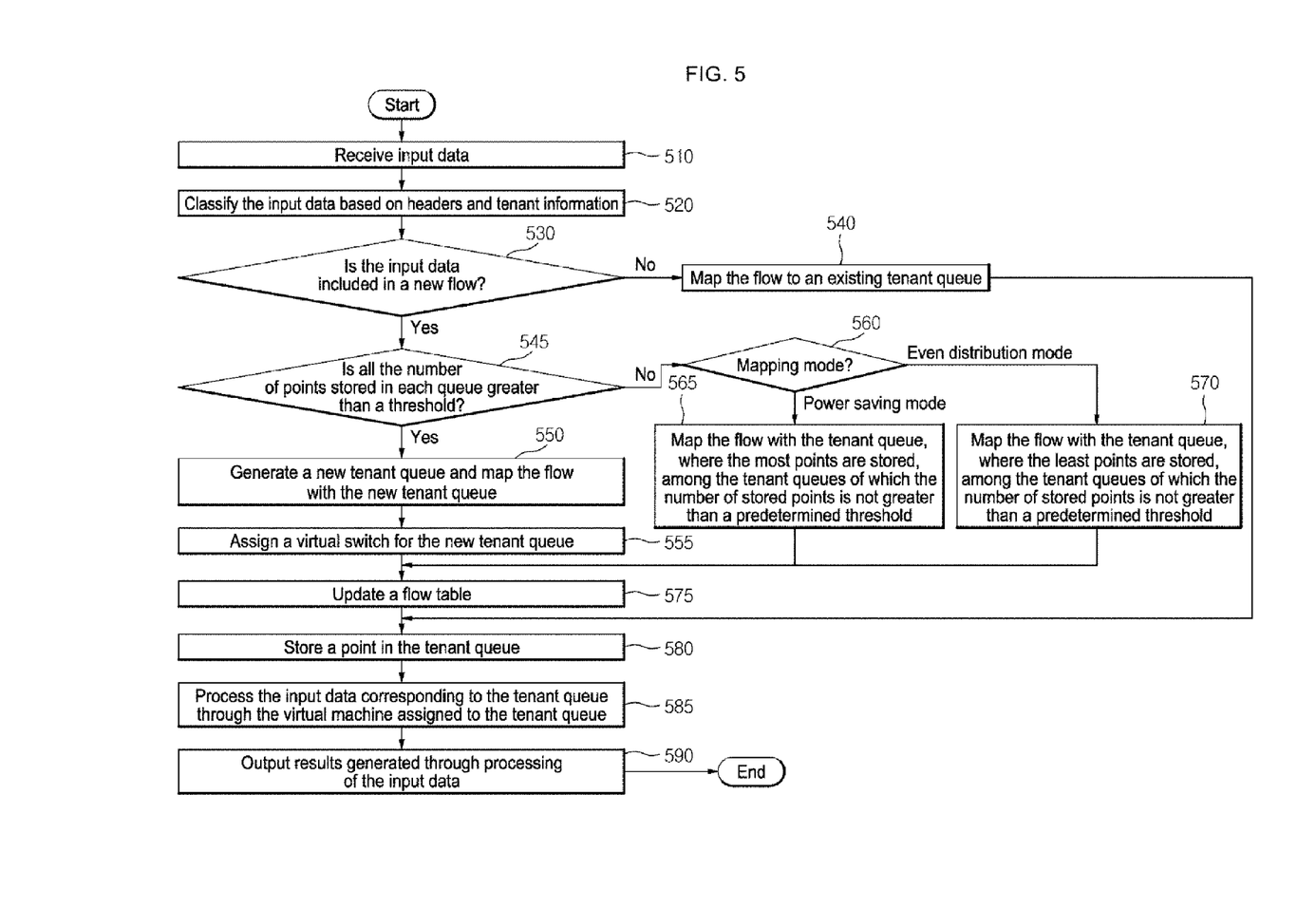
FIG. 5 is a flowchart illustrating a process for performing virtual switching, by an apparatus for virtual switching according to a second embodiment of the present disclosure.
Figure 6:
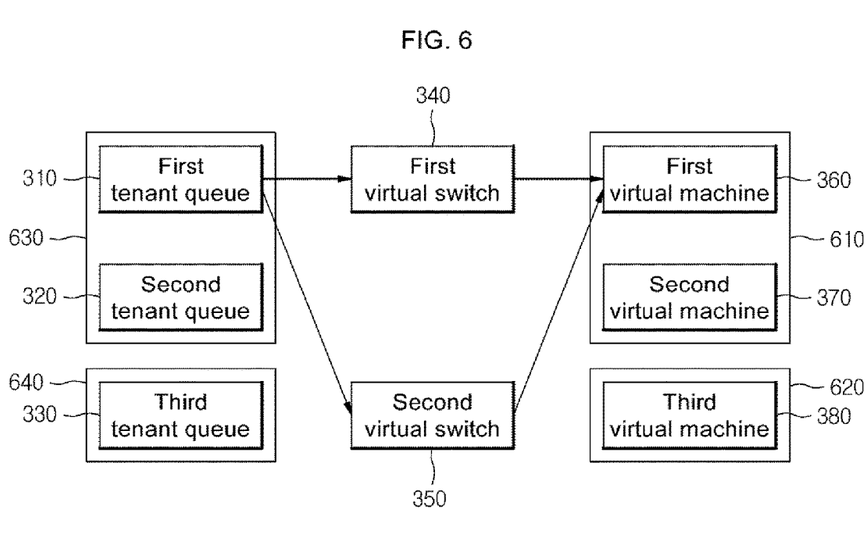
FIG. 6 is a diagram illustrating a transmission path of input data for each queue of an apparatus for virtual switching according to a second embodiment of the present disclosure to a virtual machine.

FIG. 5 is a flowchart illustrating a process for performing virtual switching by an apparatus for virtual, switching according to a second embodiment of the present disclosure. FIG. 6 is a diagram illustrating a transmission path of input data for each queue of an apparatus for virtual switching according to a second embodiment of the present disclosure to a virtual machine. The method to be explained below is performed through each unit of the apparatus for virtual switching. However, an object of each process will be called as an apparatus for virtual switching for concise and clear description. Here, each virtual machine 480 of an apparatus for virtual switching according to an example may be included in any one (485) of at least one tenant and each tenant queue may be a tenant queue assigned to any one of the tenants.

Referring to FIG. 5, in step 510, the apparatus for virtual switching receives input data.

In step 520, the apparatus for virtual switching may classify the input data into at least one flow in accordance with attributes. For example, the apparatus for virtual switching may classify the input data into any one of predetermined flows according to flow information, which is a combined value of bit masked values for values included in a header of the input data such as SIP, DIP, SPORT, DPORT, PROTOCOL and the like and tenant information of the virtual machine 480. Here, the tenant information of the virtual machine 480 may be a VLAN ID field value or a tunneling protocol ID field value of the input data.

The apparatus for virtual switching may also classify the input data into any one of predetermined flows according to flow information, which is a combined value of values generated by applying a hash function for values included in a header of the input data such as SIP, DIP, SPORT, DPORT, PROTOCOL and the like and tenant information of the virtual machine 480. Here, the apparatus for virtual switching may store the input data corresponding to each flow in the data memory 420. Therefore, since the apparatus for virtual switching classifies input data based on tenant information of the virtual machine 480 to process the input data, each tenant queue may be mapped to the flow corresponding to a certain tenant.

In step 530, the apparatus for virtual switching may determine whether the input data is classified as a new flow. For example, the apparatus for virtual switching may determine whether the input data is classified as a new flow based on whether flow information and queue information, which are corresponding to the input data, are mapped in a flow table.

When the input data is not classified as anew flow, in step 240, the apparatus for virtual switching may map the input data to a tenant queue as an existing activated flow. For example, when flow information corresponding to the input data is stored in the flow table, the apparatus for virtual switching may extract queue information mapped to the flow information and store a pointer corresponding to the input data, in a tenant queue corresponding to the queue information.

When the input data is classified as a new flow, in step 545, the apparatus for virtual switching may determine whether the number of pointers stored in each tenant queue is greater than a predetermined threshold through referring to a queue table.

When the number of pointers stored in each tenant queue is greater than a predetermined threshold in step 545, in step 550, the apparatus for virtual switching may generate a new queue and maps the new flow with the new tenant queue.

In step 555, the apparatus for virtual switching may assign the virtual switch 460 and the virtual machine 480 for the new tenant queue. Here, the apparatus for virtual switching may assign a single virtual machine 480 for the new tenant queue. Here, each virtual switch may switch the data queued to at least one tenant queue according to a dynamic policy such as round robin, weighted round robin and the like and transfer the result to the virtual machine.

When the number of stored pointers is not greater than, a predetermined threshold, in step 560, the apparatus for virtual switching may determine what a mapping mode is.

When the mapping mode is a power saving mode in step 560, in step 565, the apparatus for virtual switching may map the flow with the tenant queue, where the most pointers are stored, among the tenant queues of which the number of stored pointers is not greater than a predetermined threshold.

When the mapping mode is an even distribution mode in step 560, in step 570, the apparatus for virtual switching may map the flow with the tenant queue, where the least pointers are stored, among the tenant queues of which the number of stored pointers is not greater than a predetermined threshold.

In step 575, the apparatus for virtual switching may update the flow table based on the flow and the tenant queue which are mapped in the previous step.

In step 580, the apparatus for virtual switching may store a pointer of the input data in the tenant queue mapped with the flow.

In step 585, the apparatus for virtual switching may process the input data corresponding to each tenant queue through the virtual machine 180 assigned to the corresponding tenant queue. Here, since the single virtual machine 480 is assigned for each tenant queue, the apparatus for virtual switching may transfer the input data corresponding to the single tenant queue to the single virtual machine 480 through at least one virtual switch 460.

Referring to FIG. 6, it is assumed that the apparatus for virtual switching activates a first tenant queue 310, a second tenant queue 320, a third tenant queue 330, a first virtual switch 340, a second virtual switch 350, a first virtual machine 360, a second virtual machine 370 and a third virtual machine 380; the first tenant queue 310 and the second tenant queue 320 are a queue 630 corresponding to a tenant 610 including the first virtual machine 360 and the second virtual machine 370; and the third tenant queue 330 is a queue 640 corresponding to a tenant 620 including the third virtual machine 380. In this case, when it is assumed that the first virtual switch 340, the second virtual switch 350 and the first virtual machine 360 may be assigned for the first tenant queue 310, the apparatus for virtual switching may transfer input data corresponding to the first tenant queue 310 to the first virtual machine 360 through the first virtual switch 340 and the second virtual switch 350. Here, the apparatus for virtual switching may prevent from switching a processing order of the input data by transferring the input data corresponding to the first tenant queue 310 only to the first virtual machine 360, instead of other virtual machines 370, 380.

In step 590, the apparatus for virtual switching, outputs, results generated through processing of the input data through each virtual machine.

Exemplary embodiments of the present disclosure may be implemented in a computer system.

Figure 7:
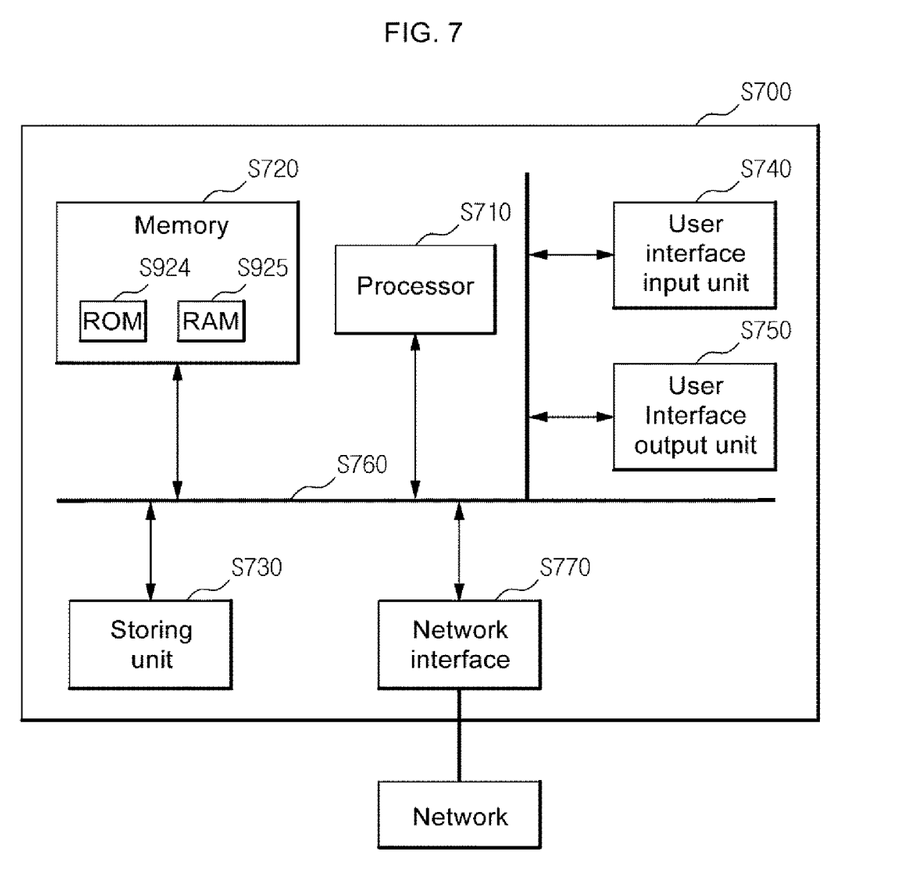
FIG. 7 is a diagram illustrating a computer system in which apparatuses for virtual switching according to a first embodiment and the second embodiment of the present disclosure are implemented.

FIG. 7 is a diagram illustrating a computer system in which apparatuses for virtual switching according to a first embodiment and the second embodiment of the present disclosure are implemented.

Exemplary embodiments of the present disclosure may be implemented in a computer system, for example, a computer readable recording medium. As shown in FIG. 7, a computer system 700 may include at least one of at least one processor 710, a memory 720, a storing unit 730, a user interface input unit 740 and a user interface output unit 750 and these may be connected through a bus 760. The computer system 700 may further include a network interface 770 to connect to a network. The processor 710 may be a CPU or semiconductor device which executes processing commands stored in the memory 720 and/or the storing unit 730. The memory 720 and the storing unit 730 may include various types of volatile/non-volatile storage media. For example, the memory may include ROM 724 and RAM 725, While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the disclosure. The scope of the present disclosure should be interpreted by the following claims and it should be interpreted that all spirits equivalent to the following claims fall with the scope of the present disclosure.

What is claimed is:

1. An apparatus for virtual switching, comprising:
   a queue memory configured to store queues;
   a data memory configured to store data;
   a mapper configured to classify the data into flows and store pointers of the data in the queues mapped onto the flows;
   a plurality of virtual machines configured to perform processes based on the data;
   a virtual switch configured to extract the data from the data memory by referring to the pointers stored in the queues and to transfer the data to the virtual machines; and
   a table provider configured to store a flow table comprising flow information for identifying the flows and queue information for identifying the queues,
   wherein the mapper determines the queues mapped onto the flows by referring to the flow table,
   wherein the mapper maps the flows onto new queues or existing activated queues when the flows are not mapped onto the existing activated queues in the flow table,
   wherein the mapper maps the flows onto the new queues when a number of pointers stored in each of the existing activated queues is greater than a predetermined threshold, and
   wherein the mapper maps the flows onto the existing activated queues when the number of pointers stored in any of the existing activated queues is not greater than the predetermined threshold.

2. The apparatus for virtual switching of claim 1, further comprising a virtual switch manager configured to assign virtual switches for the new queues when the mapper maps the flows onto the new queues.

3. The apparatus for virtual switching of claim 2, wherein when data capacity transferred through the assigned virtual switches is equal to or greater than a predetermined threshold, the virtual switch manager generates new virtual switches and assigns the new queues to the new virtual switches.

4. The apparatus for virtual switching of claim 1, wherein when the number of pointers stored in any of the existing activated queues is not greater than the predetermined threshold and a mapping mode is a power saving mode, the mapper maps the flows onto one of the existing activated queues, which stores a least number of pointers therein.

5. The apparatus for virtual switching of claim 1, wherein when the number of pointers stored in any of the existing activated queues is not greater than the predetermined threshold and a mapping mode is an even distribution mode, the mapper maps the flows onto one of the existing activated queues, which stores a most number of pointers therein.

6. The apparatus for virtual switching of claim 1, wherein the mapper classifies the data in accordance with flow information which is a value bit-masked or a value applied with a hash function for an identification reference value of the data.

7. The apparatus for virtual switching of claim 1, wherein the mapper classifies the data in accordance with flow information which is a combination of a value bit-masked or a value applied with a hash function for an identification reference value of the data and tenant information of the virtual machines.

8. A method for virtual switching in a method for performing parallel processing by an apparatus for virtual switching, the method comprising:

receiving data and storing the data in a data memory;

classifying the data into flows;

storing pointers of the data in queues mapped onto the flows;

extracting the data from the data memory by referring to the pointers stored in the queues and transferring the data to virtual machines assigned to the queues;

performing processes corresponding to the data through the virtual machines assigned to the queues;

identifying the queues mapped onto the flows by referring to a flow table comprising flow information for identifying the flows and queue information for identifying the queues; and mapping the flows onto new queues or existing activated queues when the flows are not mapped onto the existing activated queues in the flow table, wherein the mapping the flows onto the new queues or the existing activated queues when the flows are not mapped onto the existing activated queues in the flow table comprises:

mapping the flows onto the new queues when flow information corresponding to the flows is not stored in the flow table and a number of pointers stored in each of the existing activated queues is greater than a predetermined threshold; and mapping the flows onto the existing activated queues when flow information corresponding to the flows is not stored in the flow table and the number of pointers stored in any of the existing activated queues is not greater than the predetermined threshold.

9. The method for virtual switching of claim 8, further comprising:

assigning virtual switches for the new queues when the flows are mapped onto the new queues; and assigning a single processor for the new queues.

10. The method for virtual switching of claim 9, wherein the assigning virtual switches for the new queues when the flows are mapped onto the new queues comprises:

when data capacity transferred through the assigned virtual switches is equal to or greater than a predetermined threshold, generating new virtual switches and assigning the new queues to the new virtual switches.

11. The method for virtual switching of claim 8, wherein the mapping the flows onto the existing activated queues when flow information corresponding to the flows is not stored in the flow table and the number of pointers stored in any of the existing activated queues is not greater than the predetermined threshold, comprises:

mapping the flows onto one of the existing activated queues, which stores a least number of pointers therein, when a mapping mode is a power saving mode.

12. The method for virtual switching of claim 8, wherein the mapping the flows onto the existing activated queues when flow information corresponding to the flows is not stored in the flow table and the number of pointers stored in any of the existing activated queues is not greater than the predetermined threshold, comprises:

mapping the flows onto one of the existing activated queues, which stores a most number of pointers therein, when a mapping mode is an even distribution mode.

13. The method for virtual switching of claim 8, wherein the classifying the data into flows comprises classifying the data into flows in accordance with flow information which is a value bit-masked or a value applied with the hash function for an identification reference value of the data.

14. The method for virtual switching of claim 8, wherein the classifying the data into flows comprises classifying the data into flows in accordance with flow information which is a combination of a value bit-masked or a value applied with the hash function for an identification reference value of the data and tenant information of the virtual machines.

* * * * *